(12) United States Patent
Varpula et al.

(10) Patent No.: US 7,770,443 B2
(45) Date of Patent: Aug. 10, 2010

(54) COIL SYSTEM AND VOLTAGE RECTIFIERS FOR COMMUNICATION AND INDUCTIVE POWERING OF DEVICES INSIDE ROTATING TYRE OF A VEHICLE

(75) Inventors: Timo Varpula, Vantaa (FI); Kaarle Jaakkola, Helsinki (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 821 days.

(21) Appl. No.: 10/583,278

(22) PCT Filed: Dec. 17, 2004

(86) PCT No.: PCT/FI2004/000777

§ 371 (c)(1),
(2), (4) Date: Feb. 1, 2007

(87) PCT Pub. No.: WO2005/058618

PCT Pub. Date: Jun. 30, 2005

(65) Prior Publication Data

US 2007/0119636 A1 May 31, 2007

(30) Foreign Application Priority Data

Dec. 19, 2003 (FI) .................................. 20031875

(51) Int. Cl.
*B60C 23/02* (2006.01)

(52) U.S. Cl. ...................................................... 73/146.5
(58) Field of Classification Search ....................... None
See application file for complete search history.

(56) References Cited

U.S. PATENT DOCUMENTS

| 4,312,001 | A | * | 1/1982 | Marzolf ................. 340/870.16 |
| 4,334,215 | A | * | 6/1982 | Frazier et al. ............... 340/447 |
| 4,334,428 | A | * | 6/1982 | Fima et al. .................. 73/146.5 |
| 4,335,283 | A | * | 6/1982 | Migrin ..................... 200/61.25 |
| 4,354,190 | A | * | 10/1982 | Reschovsky ........... 340/870.18 |
| 4,567,459 | A | | 1/1986 | Folger et al. |
| 2005/0008161 | A1 | | 1/2005 | Olsen et al. |

FOREIGN PATENT DOCUMENTS

| EP | 0 341 226 A2 | 11/1989 |
| JP | 8136383 A | 5/1996 |
| JP | 2000-255229 A | 9/2000 |
| JP | 2003-151064 A | 5/2003 |

* cited by examiner

*Primary Examiner*—Andre J Allen
(74) *Attorney, Agent, or Firm*—Birch, Stewart, Kolasch & Birch, LLP (57) ABSTRACT

The present invention relates to a power feeding arrangement for electric loads (R) positioned in tires (20) of vehicles. According to the invention the arrangement comprises at least one feed coil ($L_f$) arranged in the vehicle (10), at least one receiver coil ($L_r$) arranged in the tire (20), and at least one load (R) electrically coupled to the receiver coil ($L_r$).

13 Claims, 10 Drawing Sheets

COIL SYSTEM AND VOLTAGE RECTIFIERS FOR COMMUNICATION AND INDUCTIVE POWERING OF DEVICES INSIDE ROTATING TYRE OF A VEHICLE

The invention relates to communication and power feeding devices for tyres of vehicles according to the preamble of claim 1.

The invention relates also to communication methods for tyres of vehicles.

The invention also relates to a tyres.

According to conventional techniques, there have been pressure sensors in tires powered by batteries. However, battery technology is not reliable and the batteries may run out of energy just at the moment the sensor is needed the most.

Also such technologies are used in the prior art where normal RF-transponders are positioned in the tires. This technology is however not very reliable in rough vehicle conditions.

It is an object of the present invention to overcome the above-described problems of the prior-art techniques and to provide an entirely novel device for feeding power to an electronic device in a tyre.

The goal of the invention is achieved by virtue of a coil arrangement in a tyre and a corresponding coil arrangement in a vehicle close to the tyre.

More specifically, the device according to the invention is characterized by what is stated in the characterizing part of claim 1.

Furthermore, the method according to the invention for feeding power to an electronic device in a tyre is characterized by what is stated in the characterizing part of claim 6.

The invention offers significant benefits over conventional techniques. The power feeding is continuous and enough power is available always, especially in the driving conditions where the information e.g., from tire pressure is needed the most.

The system is simple and the production costs are low. Further, the invention can be used with any kinds of electrical loads.

In the following, the invention will be examined with the help of exemplifying embodiments by making reference to the appended drawing, wherein.

1. Basics

To transmit power wirelessly over a short distance one feasible solution is to use alternating magnetic field. Relatively high energy density of the magnetic field allowed at certain RF frequencies makes it possible substantial power transmission over short distances. Voltage induced into a coil by a changing magnetic field is determined by the Faraday's law $$U = -\frac{\partial}{\partial t}\Phi, \qquad [1]$$

where $\Phi$ is a magnetic flux through an area A according to formula $$\Phi = \int_A \vec{B} \cdot d\vec{S} \qquad [2]$$

and where $\vec{B} = \mu \vec{H}$ is the density of a magnetic flux. On the other hand, a current i in a loop c generates a magnetic field $\vec{H}$ at point $\vec{r}$ according to Biot-Savart's law $$\vec{H}(\vec{r}) = \frac{i}{4\pi} \oint_c \frac{d\vec{c}' \times \vec{u}_D}{r^2}, \qquad [3]$$

where r is distance between the point of consideration and current element $d\vec{c}'$. We can make two important notes from the formulas [1] and [2]. First, if we have high current we have large magnetic field and, thus, high induced voltage. Second, if we differentiate sine-form current with an angular frequency $\omega=2\pi f$ $$\frac{\partial i}{\partial t} = \frac{\partial \hat{i} \sin(\omega t)}{\partial t} = \hat{i} \cdot \omega \cos(\omega t), \quad [4]$$

we notice that the higher the frequency of the current, the higher the induced voltage. Therefore we should maximize both the frequency and the current in the feed coil.

2. Frequency Bands and Maximum Transmittable Power

The frequency bands allocated to inductive applications in most European countries are listed in Table 1 (ERC Recommendation 70-03, December 2002). Considering the power transmission from the vehicle chassis into the tire, the most interesting frequencies are 6.78 MHz, 13.56 MHz, and 27 MHz.

TABLE 1

Frequency bands allocated to inductive applications in Europe. The middle column gives the maximum magnetic field allowed at the distance of 10 m from the device. 42 dBµA/m = 125.9 µA/m and 9 dBµA/m = 2.82 µA/m.

| Frequency band [MHz] | Maximum magnetic field @ 10 m [dBµA/m] | Used bandwidth [kHz] |
| --- | --- | --- |
| 6.765-6.795 | 42 | 30 |
| 7.400-8.800 | 9 | 1400 |
| 13.553-13.567 | 42 | 14 |
| 26.825-27.260 | 42 | 326 |

The authorities limit the maximum magnetic field produced by the device at the distance of 10 m. Using this limit we can estimate the maximum current in the feed coil with a given dimensions. The magnetic field is (Stratton p. 437)

$$H_\theta = \frac{1}{4\pi}\left(\frac{1}{r^3} - \frac{jk}{r^2} - \frac{k^2}{r}\right) \sin\theta \, m \, e^{-j\omega t}, \quad [5]$$

where k is $$k = \frac{2\pi}{\lambda} = \frac{2\pi f}{c}, \quad [6]$$

m is the dipole moment of the coil and r is the distance from the coil. The parameter $\lambda=c/f$ is the wavelength, c is the speed of light and f is the frequency. Dipole moment can be approximated by $$m = NiA, \quad [7]$$

where N is the number of turns, i is the current, and A is the area of the coil.

When estimating the maximum magnetic field produced by a coil at a distance of r=10 m, all the terms of equation 5 must be considered. In fact, the last term that represents radiation is dominating at all frequencies given in Table 1. From the equations above we get for the maximum overall current in the coil $$i = \frac{4\pi}{\frac{NA}{r}\sqrt{\left(\left(\frac{1}{r^2}-k^2\right)^2 + \left(\frac{k}{r}\right)^2\right)}} H_{max}. \quad [8]$$

Figure 1:
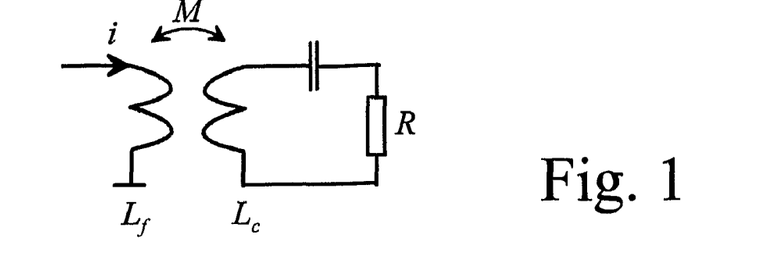
FIG. 1 shows a scheme of inductive power transmission according to the invention.

Consider FIG. 1. A current i flows in the feed coil $L_f$ that is inductively coupled to the receiving coil $L_c$ by mutual inductance M. When the receiving coil is tuned to a resonance by a capacitor, the power given to the resistor R, which represents the losses of the sensor and communication electronics circuit seen at the input of voltage rectifier, is given by $$P = \frac{\omega^2 M^2}{R}|i|^2 \quad [9]$$

Combining Eqs. 8 and 9 we obtain the maximum power that is limited by the regulations:

$$P = \frac{\omega^2 M^2}{R} \frac{16\pi^2}{\frac{N^2 A^2}{r^2}\left[\left(\frac{1}{r^2}-k^2\right)^2 + \left(\frac{k}{r}\right)^2\right]} H_{max}^2. \quad [10]$$

3. Experimental 3.1 Feed Coil

The feed coil's dimensions (A=310 mm×133 mm) were designed to cover sufficient area of the surface of the tire when placed on the wing of the vehicle. The coil was made of 3.2 mm hollow copper pipe to ensure low resistance and low dissipation in the coil. The number of turns of the coil is N=2.

Table 2 gives the maximum allowed rms current in the coil calculated by using Eq. 8 and also the figure proportional to the transmitted power by using Eq. 10. From this last figure one can conclude that the 6.8 MHz frequency range would be optimal, if the highest allowed current can be realized.

TABLE 2

The maximum current allowed in the planar feed coil used in this study. The last column gives a figure proportional to the power transmitted for the maximum allowed current in the feed coil (Eq 10).

| Frequency band [MHz] | Maximum allowed current i[A], N = 2 | Maximum RMS voltage [V] @ $i_{max}$ | Maximum achievable power [W] in tire (approximative) |
| --- | --- | --- | --- |
| 6.765-6.795 | 11.23 | 1010 | 10 |
| 7.400-8.800 | 0.17 | 19 | 0.003 |
| 13.553-13.567 | 2.58 | 490 | 2 |
| 26.825-27.260 | 0.62 | 411 | 0.5 |

Table 2. The maximum current allowed in the planar feed coil used in this study. The last column gives a figure proportional to the power transmitted for the maximum allowed current in the feed coil (Eq 10).

The impedance of the feed coil was measured at four frequencies given in table 3. The impedances are measured when the coil is in air and there is no external loading. Table 3 also lists the Q values.

TABLE 3

The impedance and Q value of the feed coil at four frequencies.

| Frequency (MHz) | Impedance (Ohm) | Q value |
| --- | --- | --- |
| 6.78 | 1.0 + j90.1 | 90 |
| 13.56 | 2.1 + j189 | 90 |
| 27 | 59 + j663 | 11 |
| 36.3 (self resonance) | 3210 | |

From Table 2 one can conclude that the highest allowed current is extremely difficult to realize in practice. This would lead to too high a voltage in the feed coil. The feed coil is tuned with a series capacitor. The capacitor must be able to withstand the same voltage as the coil.

The sensitivity of the coil impedance to the presence of the tire was studied at 6.78 MHz. When the coil was placed in touch to the tread the impedance chanced to Z=3.6+j93.3Ω. This means that in order to keep the coil tuned, the capacitor should vary from 261 pF to 252 pF. The raise in resistance (1Ω vs 3.6Ω) is not critical. It means that the conductive rubber of the tire gives additional loading and the coil warms up the tire. The relatively small change in the capacitance, 9 pF, when the coil is brought in touch with the tire indicates that real-time tuning of the coil is not necessary. The coil must be tuned only during the initialization sequence at the vehicle start.

3.2 Power Amplifier

Figure 2:
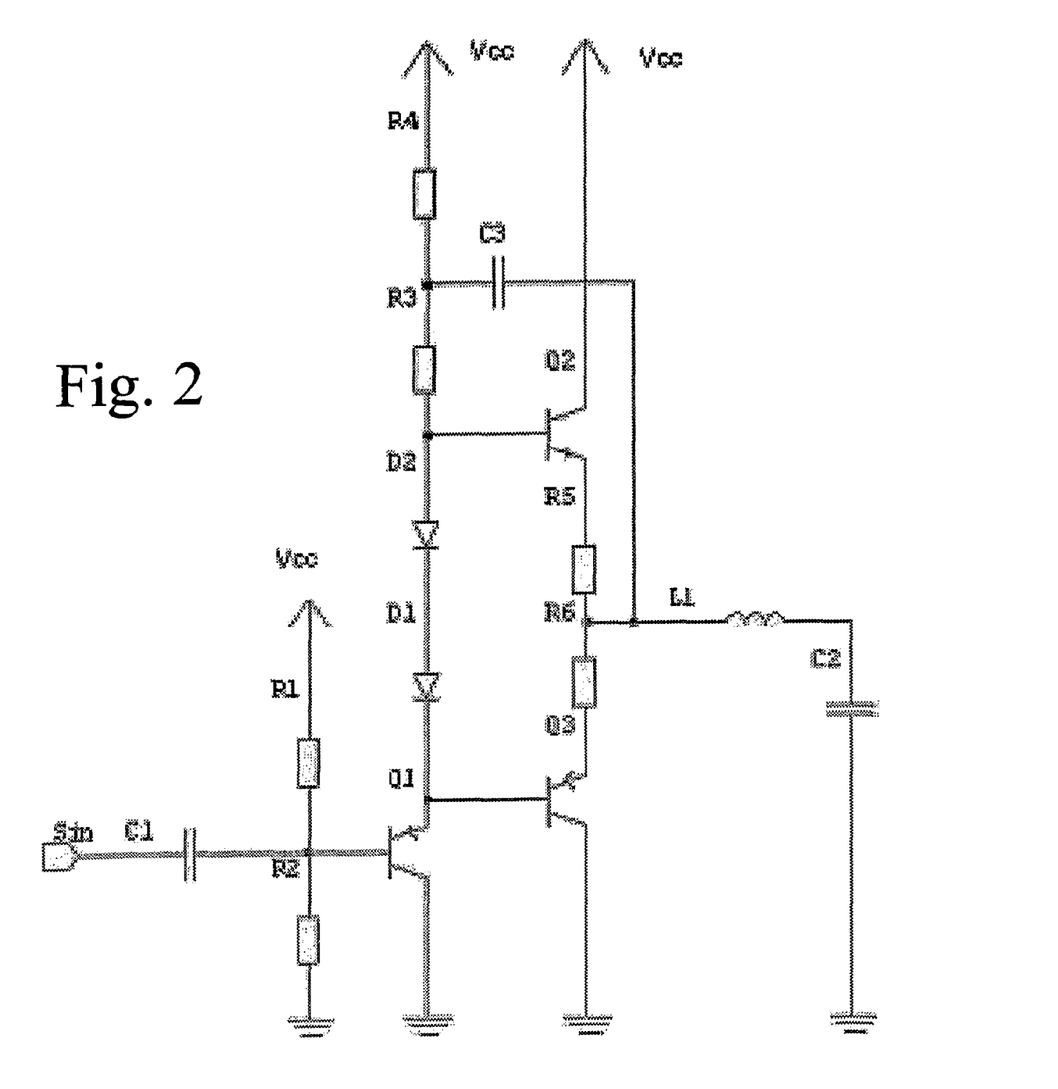
FIG. 2 shows the schematic diagram of the AB-class power amplifier according to the invention, where the feed coil L1 is tuned with a capacitor C2.

FIG. 2. The schematic diagram of the AB-class power amplifier. The feed coil L1 is tuned with a capacitor C2.

For testing the inductive supply an rf power amplifier was designed and constructed. It is intended to amplify a sinusoidal signal from an oscillator. In the tests a signal generator was used instead of an oscillator. A compromise was made between the power efficiency and the level of distortion. Therefore we ended up using an AB class push-pull output stage whose schematic diagram is seen in FIG. 2.

The values of used components can be seen in Table 4. Capacitors C1 and C3 have large values in order to show a low impedance at the frequency of 6.78 MHz.

TABLE 4

Component values of the circuit on FIG. 2.

| Component | Value |
| --- | --- |
| R1 | 875 Ω |
| R2 | 619 Ω |
| R3 | 14.1 Ω |
| R4 | 22.7 Ω |
| R5 | 0.25 Ω |
| R6 | 0.25 Ω |
| C1, C3 | 1 µf |
| C2 | 259 pF |

3.3 Components

The power supply works at relatively high frequency and it must provide a high current into the series tuned feed coil. These requirements are demanding to the quality of the transistors used in the circuit. The transistors Q2 and Q3 should have high level of maximum collector current (more than 2 $A_{rms}$), withstand high level of power dissipation (at least 10 W) and be fast ($f_t$ around 200 MHz). Because of the low level of the load impedance, as high a current gain, $h_{fe}$, as possible is recommended as well. Semelab's transistors BUP40 (PNP) and BUP41 (NPN) were decided to be used. These transistors satisfy all the other specifications, but the speed of the transistors ($f_t$=120 MHz) was barely tolerable. Using these transistors at higher frequency bands than 6.78 MHz is not advisable. Using these transistors in a Darlington connection is not a functional solution, either. Also it is worth noting that transistors with a higher value of $f_t$ would suffer lower levels of distortion and signal impurity.

Transistor Q1 should have, also, high $f_t$ and $h_{fe}$, but high values of power dissipation and collector current are not required.

3.4 Circuit

When the circuit was designed, attention was paid to the fact that the power source of the amplifier is a 12 V battery; no two-sided voltage source is available. Therefore the input signal was biased to 6 V. This is done with transistor Q1 in FIG. 2. Q1 acts as a voltage follower lowering at the same time the required current level of the input signal.

Transistors Q2 and Q3 operate in a push-pull fashion as emitter followers.

Diodes D1 and D2 (1N4148) compensate the voltage drop over np-junction between the base and the emitter of the transistors Q2 and Q3. Although in this case the voltage drop over diode is greater than the voltage drop over base and emitter of the BUP4x transistors. This is compensated by coupling several diodes parallel. In this way the amount of current passing through each diode is low enough that, according to the i-v graph of a diode, the voltage is lower over the junction.

Warming-up and thermal instability are problems faced when working with power amplifiers. Small resistances R5 and R6 at the emitters of transistors Q2 and Q3 are there to prevent thermal runaway.

High input impedance is always recommended in an amplifier circuit reducing the level of current demanded from the signal source. When dealing with high currents the impedance levels are set to be low. Problem arises when we have low biasing resistances, as it is in this case. Because these resistors are parallel with the load, they affect greatly to the amount of input impedance. In this circuit a technique called "bootstrapping" is used. Large capacitor C3 ensures that ac voltage between the nodes of resistor R3 remains fairly the same, while at same time dc biasing is working as it should. Thus the ac current through R3 is almost zero and therefore $r_3$=u/i≈∞. Now only the load resistance (and the current gain) affects the amount of input resistance. Alas, the poor frequency characteristic of BUP4x transistors lowers current gain as frequency rises, lowering the input impedance at the same time.

To prevent unwanted oscillation a large capacitor is placed across the ground and the voltage source. This component is not shown in the schematic in FIG. 2.

3.5 Receiver Coils in Tire

At first the optimal position of the coils in the tire were tested. A configuration where the coil runs circumferentially around the tire's inner surface turned out to be unsuitable for several reasons. First, the inductive voltage was too low due the relatively high impedance of the coil; although, some improvement would have been made if more loops had been coupled parallel in the coil. Nevertheless this would have brought the lowest resonance frequency of the coil too near the used transmission frequency. Second, the mutual inductance of a feed coil and a circumferential receiver coil is low. Third, when the AC magnetic field penetrates the side wall of the tire, eddy currents are generated in the rim. These currents tend to lower the coupling between feed and receiver coil even further.

Figure 3A:
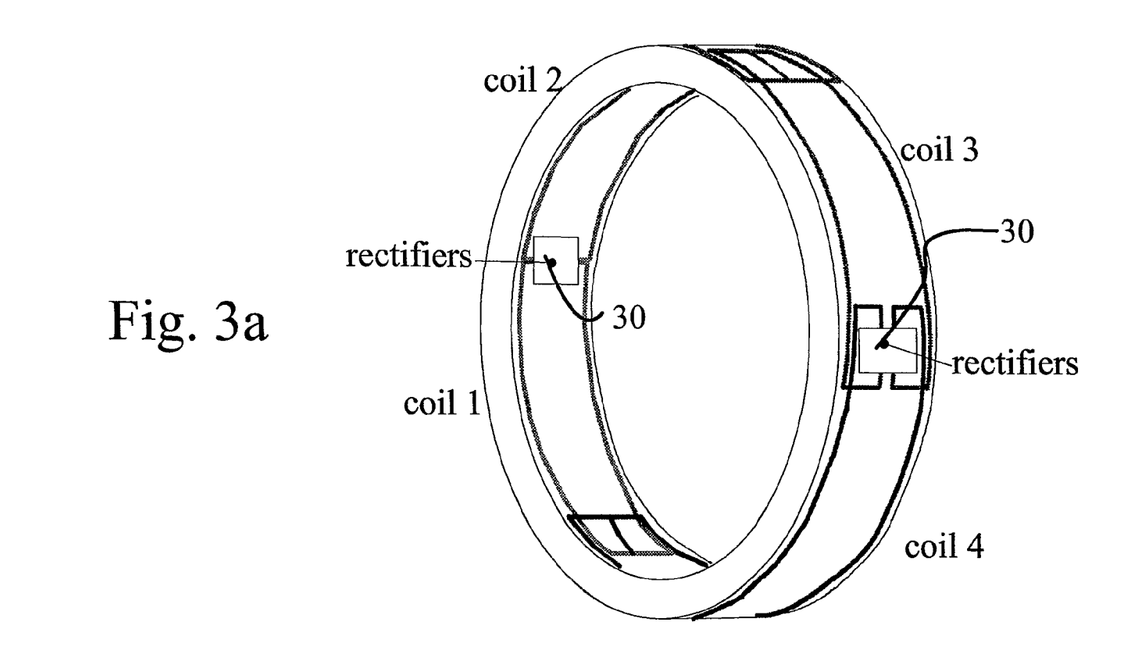
FIG. 3a shows as a perspective view the four receiving coils and two rectifiers in the inner liner of the tire according to the invention.
Figure 3B:
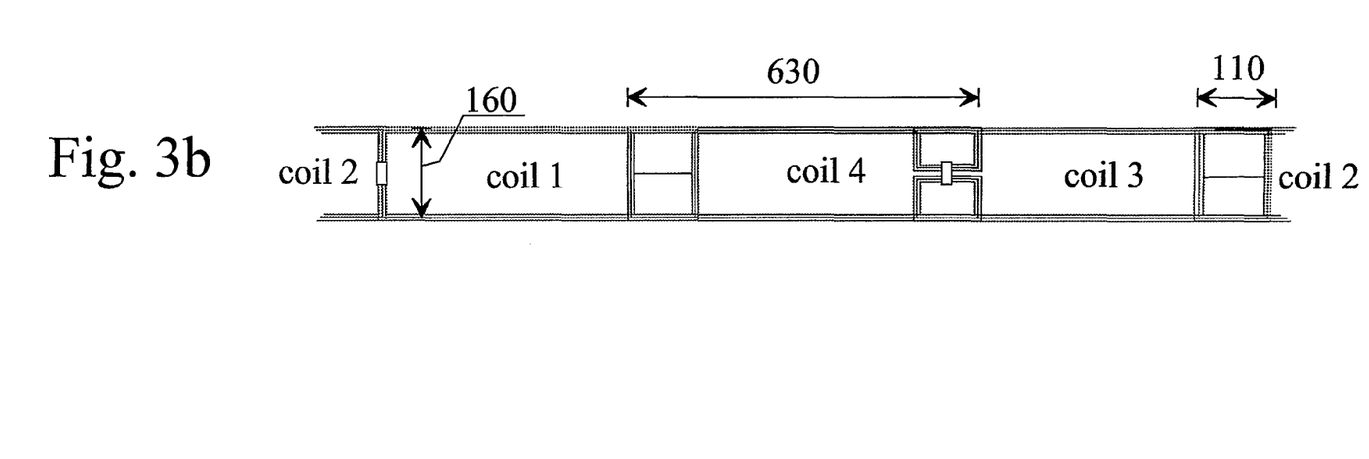
FIG. 3b shows FIG. 3a as a top view.
Figure 12:
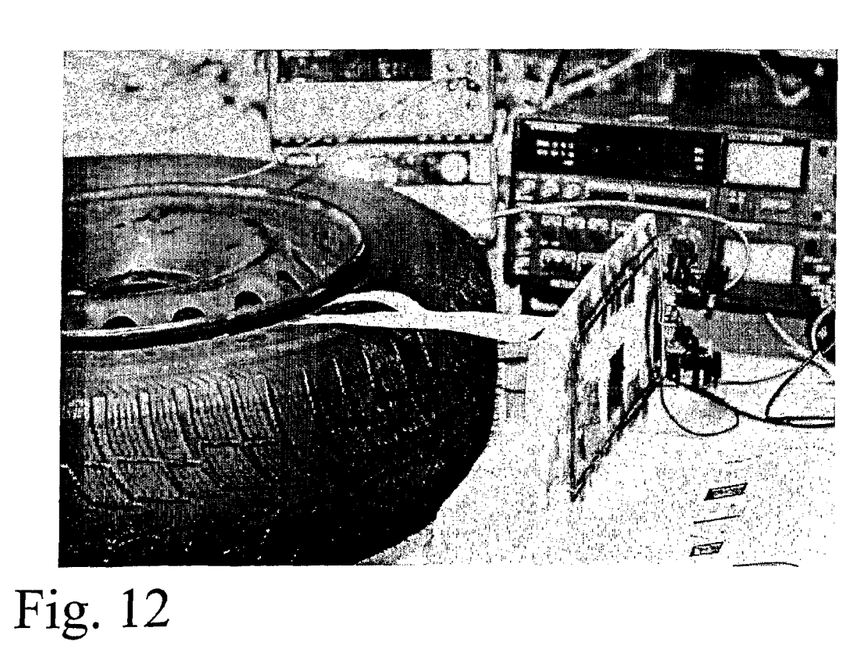
FIG. 12 shows an arrangement where the transmitted power versus frequency is being measured. The coil is at a distance of 11 cm from the surface of the tire.

Receiver coil and feed coil configuration shown in FIGS. 3 and 12 is a better solution, in which the magnetic of the feed coil goes through the belt of the tire. There are four separate receiver coils, which have individual voltage doubler rectifiers. In this way the coil system works below self resonant frequency of the coil. If there were only one coil, its self resonant frequency would be below 6 MHz. The self resonant frequency of each one-turn coil is also increased by making the winding from three parallel wires.

There are two alternatives to place the feed coil: vertically on the lower edge of the wing or on a separate support attached on the suspension of the wheel. This way the transmitted magnetic field remains fairly the same regardless of the vertical position of the wheel in different loading conditions.

TABLE 3

The dimensions of the coils inside the tire (average values).

| | |
|---|---|
| Length | 630 mm |
| Width | 160 mm |
| Distance between parallel loops | 4-8 mm |
| The length of overlapping area of neighbouring coils | 110 mm |

These reasons had led to an alternative approach in which four coils were installed on the inner surface of the test tire to enable optimal inductive power transmission. The results in this report are on this configuration only. The receiver coil configuration in the tire is shown in FIG. 3. Each coil is made of three parallel loops to lower the impedance of the coil. The wire in the loops is standard steel cord, Bekaert diameter 0.35 mm, used in the tire belt. The wires were attached on the inner liner whose surface was covered with non-conducting rubber layer (silicone). The coils covered the whole planar area of the tire's inner surface and where installed partly overlapping to ensure that induced voltage would not drop too low when the feed coil is between the two receiving coils, see FIG. 3.

3.6 Electronics

Figure 4:
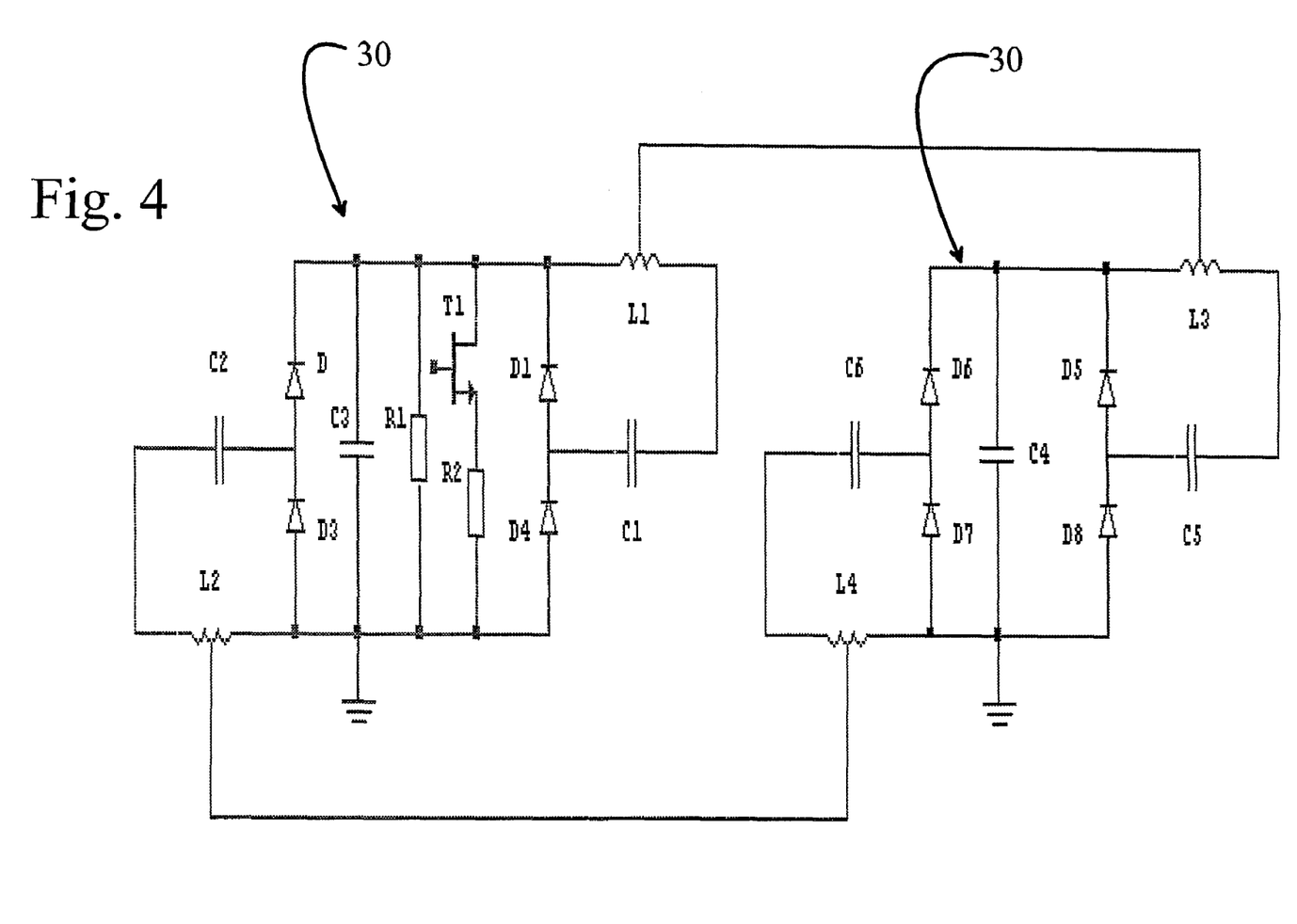
FIG. 4 shows circuit of the voltage rectifiers according to the invention, four tuned receiving coils connected to load resistor R and the device for communication consisting of transistor T1 and resistor R2.

The induced voltage was rectified with a voltage doubler structure consisting of an HSMS-2702 Schottky diode pair and a load capacitor as shown in FIG. 4. To avoid high impedance and the capacitive coupling of AC current in long parallel lines, there were two rectifier configurations for the each pair of coils on the opposite sides of the tire. The DC output voltages of the two rectifier pairs were summed by connecting the middle taps of two coils on the same halves of the tire, as shown in FIGS. 3 and 4. During the tests the power consumption of the readout and RF transmission electronics were simulated with a R=500Ω resistor. The goal was to obtain the power of 100 mW for this resistor. This would mean that a voltage of 7.1 V over R.

The communication from the tire electronics to the reader equipment in the car body is implemented by changing the load resistance of the rectifier circuit. This is done using transistor T1 and resistor R2. Changing the gate voltage of the transistor changes the effective DC load of the rectifier and this can be detected by the reading equipment in the car body via the changed mutual inductance between the transmitter and the receiver coils. The change of the mutual inductance between the coils changes also the impedance of the transmitter coil.

The idea of this coil configuration is to provide power at a single position inside the tire independent of rotation angle of the tire. Imagine, for example, that coil3 (L3) is energized with magnetic field. The dc current produced by rectifier D5/D8 flows to load resistor R via L3, L1 and back via L2 and L4. A corresponding dc path is found for every coil.

FIG. 4. shows a circuit of the voltage rectifiers, four tuned receiving coils connected to load resistor R and the device for communication consisting of transistor T1 and resistor R2.

TABLE 4

Component values of the circuit on FIG. 4 at the frequency of 6.78 MHz.

| Component | Value |
|---|---|
| C1 | 440 pF |
| C2 | 450 pF |
| C3, C4 | 1 µf |
| C5 | 350 pF |
| C6 | 330 pF |
| R | 500 Ω |

4. Tests and Results 4.1 Transmitted Power

The output transistors turned Q2 and Q3 of FIG. 2 turned out to be too slow for frequencies higher than 6.8 MHz. Therefore the tests were performed at only one frequency. First the exact resonance frequency was found out. This proved to be 6.48 MHz; in other words, slightly less than the official band 6.765-6.795 MHz. Because the exact frequency is irrelevant, no adjustment of resonance frequency was tried and the results shown here are for 6.48 MHz.

The tire in the experiments is Nokian Tyres Hakkapeliitta 2 (195/65 R15). The table 5 shows how much power we were able to get inside the tire for different feed coil distances from the tire surface. The feed coil was tangential to the surface of the tire, see FIG. 11. The tire was installed to the rim. Minimum and maximum values are given because the induced voltage drops when the feed coil is between receiving coils.

TABLE 5

The amount of rectified power given to a 500 Ω resistor inside the tire for different distances between feed coil and tire surface. Frequency is 6.48 MHz. In this experiment only coil 4 is energized.

| Distance from the tire (cm) | Minimum voltage (V) | Maximum voltage (V) | Minimum power (mW) | Maximum power (mW) |
|---|---|---|---|---|
| 0 | 12.0 | 15.7 | 288 | 493 |
| 5 | 10.8 | 13.1 | 233 | 343 |
| 7.5 | 8.1 | 9.4 | 131 | 177 |
| 10 | 6.2 | 7.2 | 76.9 | 104 |
| 12.5 | 4.9 | 5.9 | 48.0 | 69.6 |
| 15 | 3.9 | 4.4 | 30.4 | 38.7 |
| 20 | 2.5 | 2.8 | 12.5 | 15.7 |

It should be pointed out, that higher power levels could be achieved if faster power transistors can be found (2SA1258/2SA1259 and 2SC3144/2SC3145, for example).

4.2 Current in the Feed Coil

From formulas [1] and [3] we obtain the current running through the feed coil by measuring the voltage induced into a test coil. If the area of the loop A is small, we can assume that the density of the magnetic field H generated by the feed coil is constant across this area. We place the test coil in the center of the feed coil. The induced voltage in the test loop generated by the current i in the feed coil is $$U_{RMS} = \mu_0 \omega A_t N_t \frac{N i}{\pi \sqrt{a^2 + b^2}} \left( \frac{a}{b} + \frac{b}{a} \right), \quad [11]$$

where $\mu_0$ the permeability of air, $N_t$ is the number of turns in the test coil, $A_t$ is the area of the test coil, N is the number of turns of the feed coil, and a and b are the side lengths of the rectangular feed coil. By using a test coil ($A_t=18.1 \cdot 10^{-4}$ m$^2$, N=4) the rms current in the feed coil was measured and found to be about 2 A. Thus there is still a large margin with the absolute maximum allowed 11.23 A. The resistance of the feed coil at 6.48 MHz is about 1Ω. Therefore the power consumed in the feed coil P=RI$^2$=4 W. The overall power consumption of the supply electronics $P_{total}$=16.9 W. Thus the efficiency of the circuit is η=24%.

4.3 Band Width and Quality Factor

The quality factor of the resonating system is obtained with the following formula $$Q = \frac{f_r}{f_{-3dB,h} - f_{-3dB,l}}, \quad [12]$$

where $f_r$ is the resonance frequency and $f_{-3dB,h}$ and $f_{-3dB,l}$ are the frequencies at which the transmitted power has been halved. In test setup the feed coil was installed 11 cm away from the surface of the tire, see FIG. 12. The frequency of the signal generator was swept over the resonant frequency of the system and the power in the 500-Ohm load resistor in the tire was recorded. From FIG. 5 we get values $f_r$=6.49 MHz, $f_{-3dB,h}$ and $f_{-3dB,l}$=6.60 MHz-6.39 MHz=0.21 MHz and thus the quality factor is Q≈31.

Figure 5:
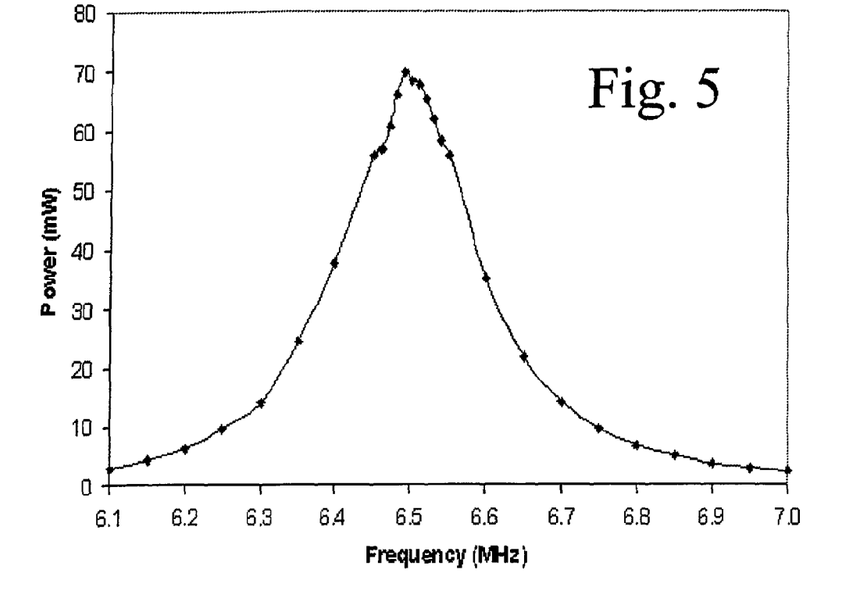
FIG. 5 is a graph illustrating the power in the R=500Ω load resistor versus frequency at the distance of 11 cm. (Q≈31)

FIG. 5 is a graph showing the power in the 500Ω resistor versus frequency at the distance of 11 cm. (Q≈31)

4.4 Effects to the Tuning Caused by External Loads

Various measurements were done in order to find out the influence of different objects close to the feed coil to the tuning. In the first tests no other objects where included, though, but the coil was brought in near contact to the tire (2 cm away from the outer surface). As can be seen from FIG. 6, the resonance frequency does change significantly from the value, when the test tire was 11 cm from the feed coil. The quality factor, instead, is reduced to Q≈22.

Figure 6:
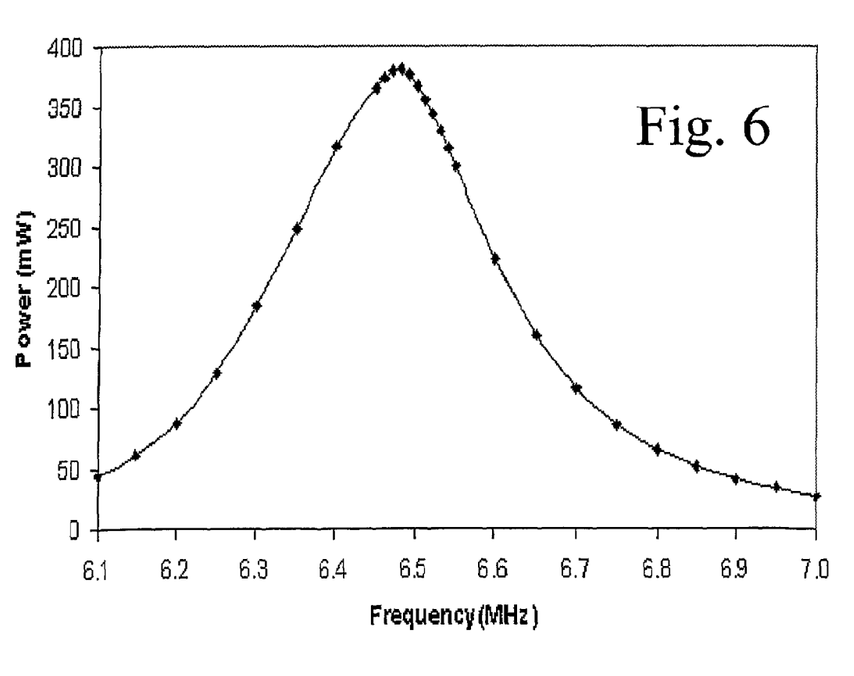
FIG. 6 is a graph illustrating the power in the 500Ω resistor versus frequency at the distance of 2 cm. (Q≈22).

FIG. 6 is a graph showing the power in the 500Ω resistor versus frequency at the distance of 2 cm. (Q≈22).

Figure 7:
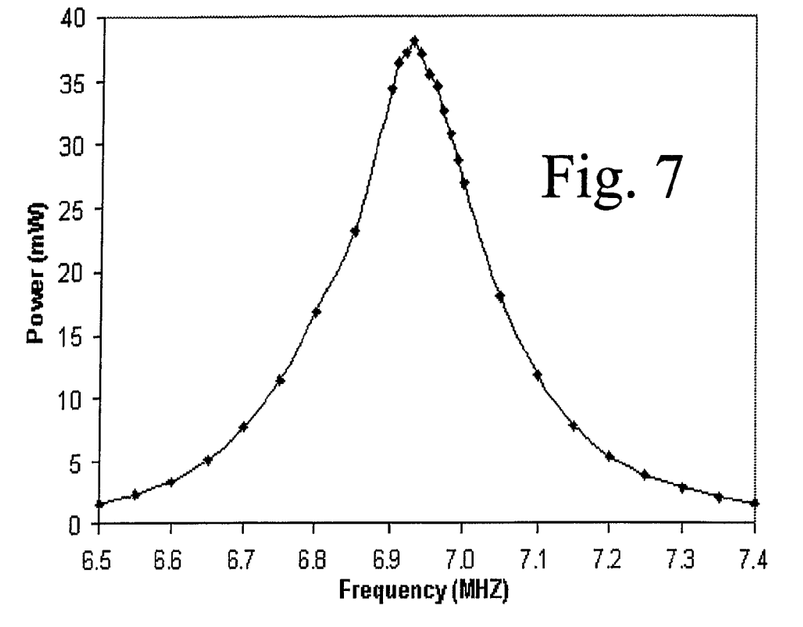
FIG. 7 is a graph illustrating the power in the 500Ω resistor versus frequency at the distance of 11 cm. An aluminium block was installed 5 cm behind the feed coil. (Q≈30).

FIG. 7 is a graph showing the power in the 500Ω resistor versus frequency at the distance of 11 cm. An aluminium block was installed 5 cm behind the feed coil. (Q≈30).

Figure 8:
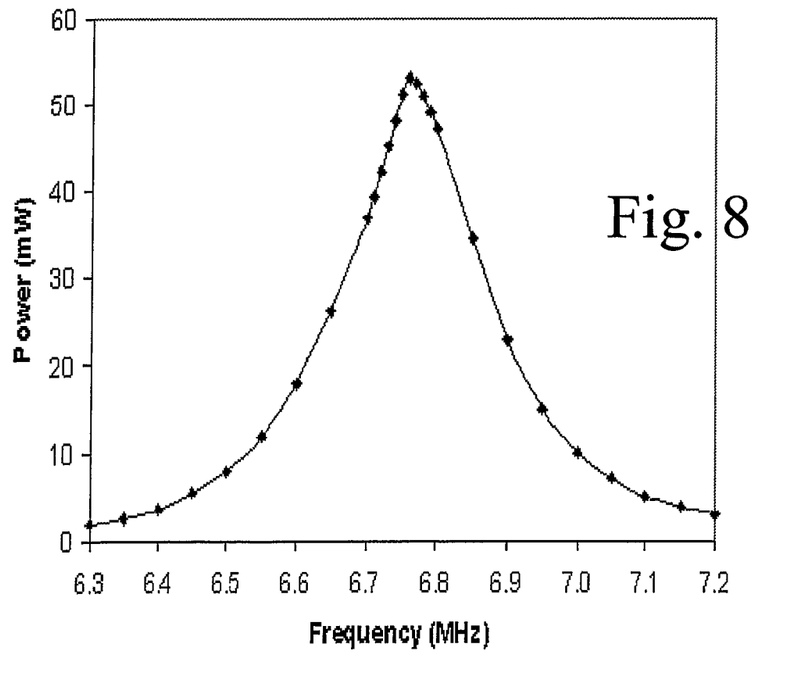
FIG. 8 is a graph illustrating the power in the 500Ω resistor versus frequency at the distance of 11 cm. An iron block was installed 5 cm behind the feed coil. (Q≈28).

In the second set of tests, aluminium (450×156×28 mm$^3$) and iron (187×144×106 mm$^3$) blocks were brought to the distance of 5 cm from the feed coil. The feed coil remained at the distance of 11 cm from the tire and the metal blocks were installed behind the coil. Curves in FIGS. 7 and 8 show quite a remarkable change in the resonance frequency. The quality factor is reduced as well as the power transmitted into the load resistor.

FIG. 8 is a graph showing the power in the 500Ω resistor versus frequency at the distance of 11 cm. An iron block was installed 5 cm behind the feed coil. (Q≈28).

Figure 9:
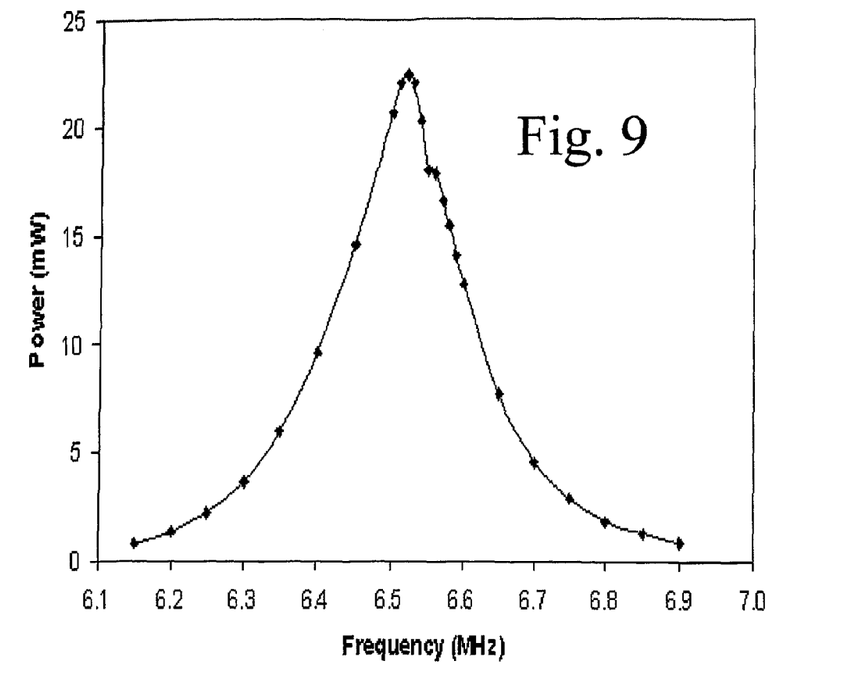
FIG. 9 is a graph illustrating the power in the 500Ω resistor versus frequency at the distance of 17 cm. An empty bucket was installed between the coil and the test tire. (Q≈33).

FIG. 9 is a graph showing the power in the 500Ω resistor versus frequency at the distance of 17 cm. An empty bucket was installed between the coil and the test tire. (Q≈33).

In the third set of tests an effect of water was measured. First an empty bucket was installed between the feed coil and the test tire to give reference values. Now the feed coil was 17 cm from the tire. After this the bucket was filled with water and the power versus frequency graph was measured once again.

Figure 10:
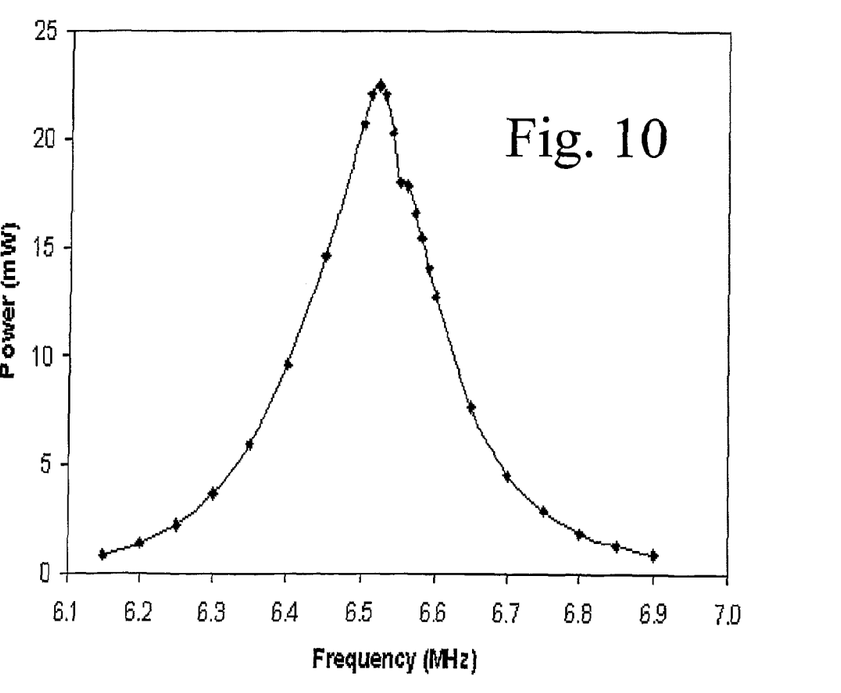
FIG. 10 is a graph illustrating the power in the 500Ω resistor versus frequency at the distance of 17 cm. An Bucket full of water was installed between the coil and the test tire. (Q≈33).

FIG. 10 shows the power in the 500Ω resistor versus frequency at the distance of 17 cm. An Bucket full of water was installed between the coil and the test tire. (Q≈33).

In conclusion of these measurements, the resonant frequency is sufficiently insensitive to the coil position with respect to the tire. Also the band width of the power transmission remains high, at least 200 kHz. These results mean that no real-time tuning of the feed coil is needed. This would have been a difficult task because of the high voltage over the feed coil. In these tests the rms voltage was about 180 V. Also the resonance is not sensitive to the presence of water between the feed coil and tire. On the other hand, large metal parts close to the feed coil affect the resonant frequency. So the metallic environment of the feed coil should remain unchanged, and the presence of large metallic parts near the feed coil should be taken into account in the design of the coil. If the feed coil can be placed very close to the tire (2 cm), large power can be transferred—even 0.38 W in these experiments.

Figure 11:
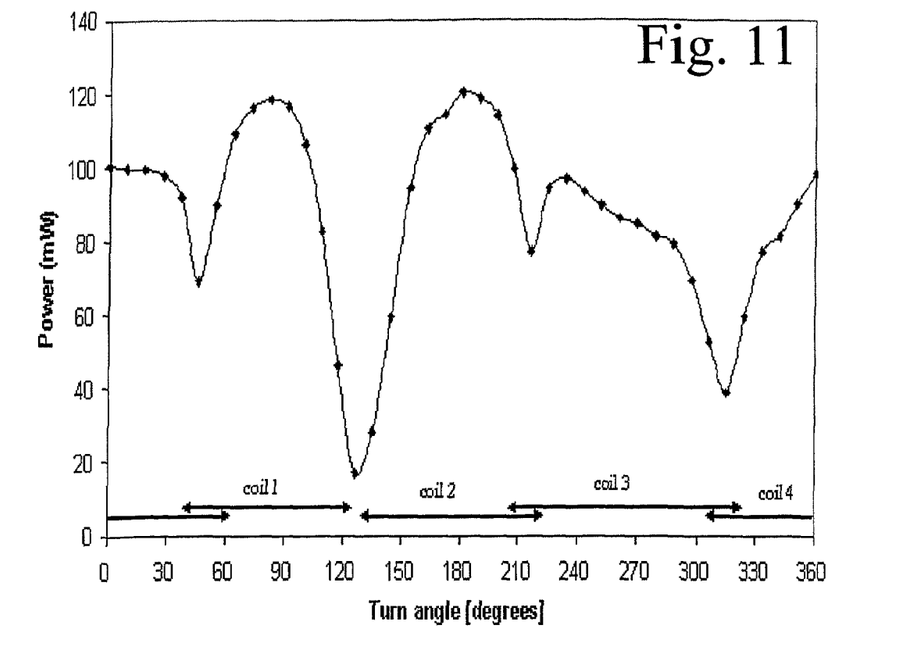
FIG. 11 is a graph illustrating the power in the 500Ω resistor versus turn angle of the wheel at the distance of 11 cm.

FIG. 11 shows a graph which presents the power in the 500Ω resistor versus turn angle of the wheel at the distance of 11 cm.

FIG. 12 shows a graph which presents transmitted power versus frequency is being measured. The coil is at a distance of 11 cm from the surface of the tire.

Figure 13:
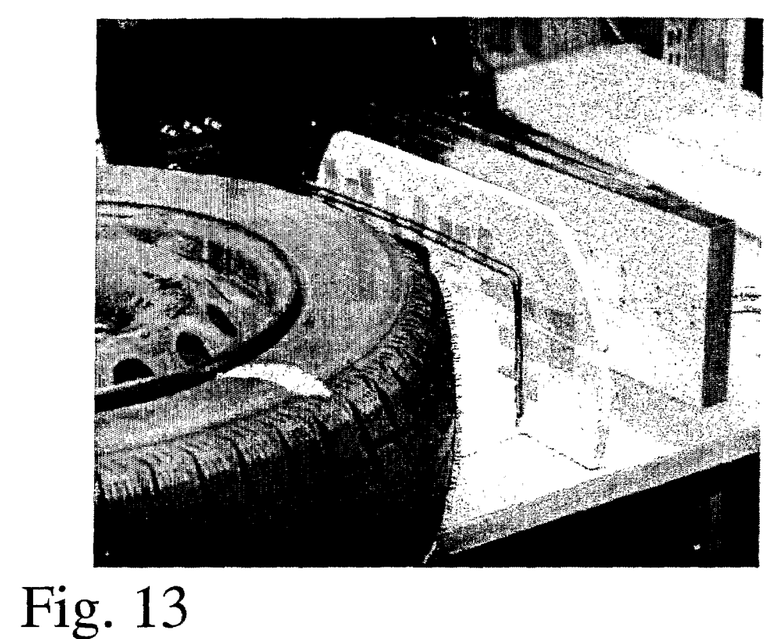
FIG. 13 shows an arrangement where a test setup is installed to measure the effect of an aluminium block to the transmitted power.

FIG. 13 shows a test setup is installed to measure the effect of an aluminium block to the transmitted power.

Figure 14:
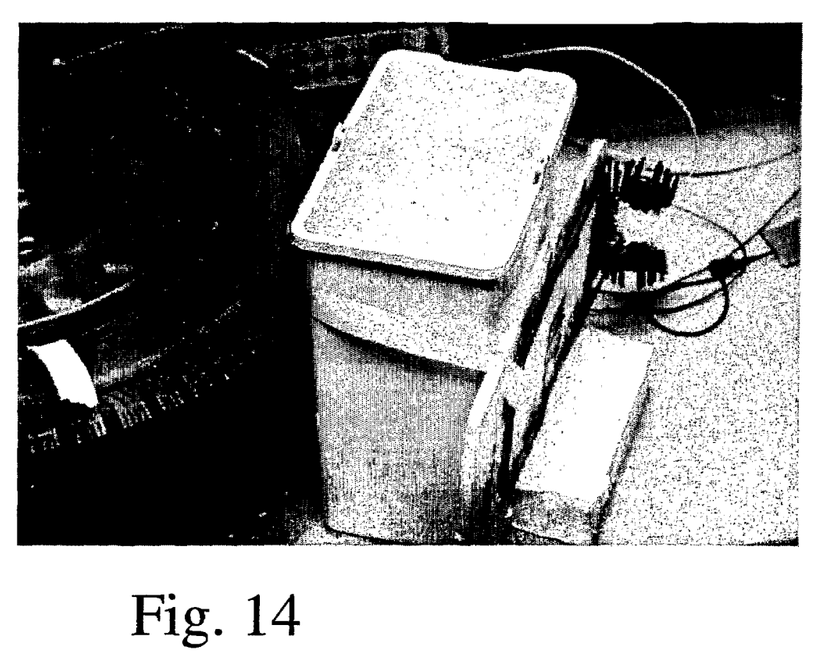
FIG. 14 shows s test setup is installed to measure the effect of a bucket full of water to the inducted power.

FIG. 14 shows a test setup is installed to measure the effect of a bucket full of water to the inducted power.

Figure 15:
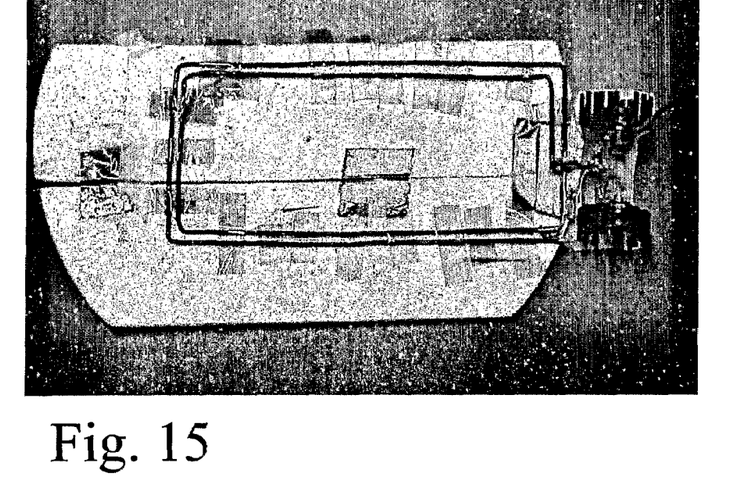
FIG. 15 shows a feed coil and amplifier according to the invention.

FIG. 15 shows a feed coil and amplifier.

Figure 16:
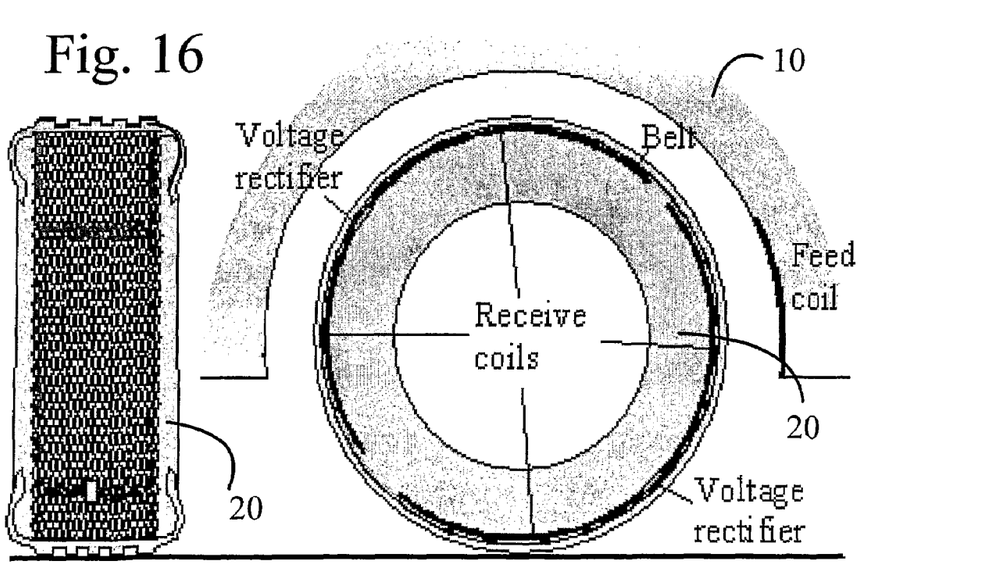
FIG. 16 shows receive coils in tyre and feed coil in the wing according to the invention.

FIG. 16 shows receive coils in tyre and feed coil in the wing.

Figures 17, 18:
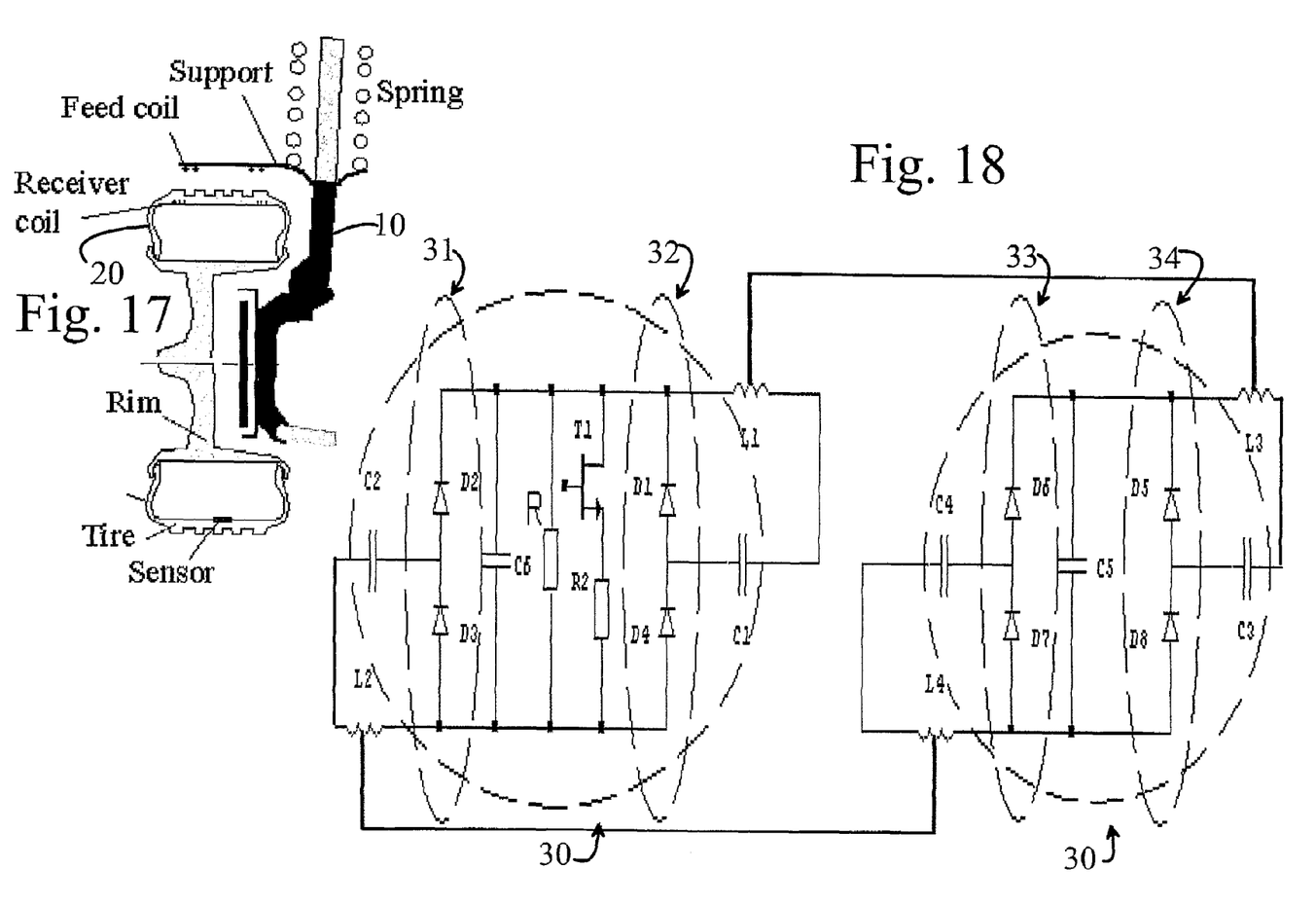
FIG. 17 shows an alternative position of the feed coil according to the invention. This position, shown for front wheel, ensures that the distance between feed coil and receiver coil does not vary.
FIG. 18 shows FIG. 4 configured in a new way.

FIG. 17 shows an alternative position of the feed coil. This position, shown for front wheel, ensures that the distance between feed coil and receiver coil does not vary.

According to FIG. 18 the diodes D of the circuit are grouped as rectifiers 31-34 and rectifiers are grouped in pairs 31-32 and 33-34 as rectifier groups 30.

What is claimed is:

1. A power feeding arrangement for electric loads (R) mounted in tires (20) of vehicles, which arrangement comprises
    at least one feed coil ($L_f$) arranged in the vehicle (10),
    at least one receiver coil ($L_1$-$L_4$) arranged in the tire (20), and
    at least one load (R) electrically coupled to the receiver coil ($L_1$-$L_4$) via voltage rectifier(s) (31-34)
    characterized in that in the arrangement
    each receiver coil ($L_1$-$L_4$) is tuned with a serial capacitor ($C_1$-$C_4$) and connected to a voltage rectifier (31-34) whereby the DC output currents produced by each rectifier (31-34) flow to the load (R) via at least one receiver coil ($L_1$-$L_4$).

2. The arrangement of claim 1, characterized in that the DC outputs of the voltage rectifiers (31-34) are coupled to the load resistor (R) via receiver coils ($L_1$-$L_4$).

3. The arrangement of claim 1, characterized in that the load (R) is an electronic circuit.

4. The arrangement of claim 1, characterized in that the number of receiver coils ($L_1$-$L_4$) is four in each tire.

5. A tire (20) comprising receiver coils according to any previous claim, characterized in that the surfaces of adjacent receiver coils ($L_1$-$L_4$) overlap so that the received power is essentially independent of the rotation angle of the tire.

6. A power feeding method for electric loads (R) mounted in tires (20) of vehicles, in which method
    at least one feed coil ($L_f$) arranged in the vehicle (10) is used for feeding electrical power,
    at least one receiver coil ($L_1$-$L_4$) positioned in the tire (20) is used for receiving the fed power, and at least one load (R) electrically coupled to the receiver coil ($L_1$-$L_4$) via voltage rectifier(s) (31-34), characterized in that each receiver coil ($L_1$-$L_4$) is tuned with a serial capacitor ($C_1$-$C_4$) and connected to a voltage rectifier (31-34) whereby the DC output currents produced by each rectifier (31-34) flow to the load (R) via at least one receiver coil ($L_1$-$L_4$).

7. The method of claim 6, characterized in that the DC outputs of the voltage rectifiers (31-34) are coupled to the load resistor (R) via receiver coils.

8. The method of claim 6, characterized in that the number of receiver coils ($L_1$-$L_4$) is four in each tire.

9. The method of claim 6, characterized in that the load (R) is an electronic circuit.

10. A tire (20) for a vehicle (10), characterized in that the tire (20) comprises at least one serially tuned receiver coil ($L_1$-$L_4$) for receiving electrical power.

11. A tire according to claim 10, characterized in that the number of receiver coils ($L_1$-$L_4$) is 4 or more.

12. A tire according to any previous claim, characterized in that the tire (20) comprises two sets of voltage rectifiers (30).

13. A tire (20) comprising receiver coils according to claim 12, characterized in that the surfaces of adjacent receiver coils ($L_1$-$L_4$) overlap so that the received power is essentially independent of the rotation angle of the tire.

* * * * *